United States Patent
Zeng et al.

(10) Patent No.: US 7,764,664 B2
(45) Date of Patent: *Jul. 27, 2010

(54) MODIFIED START FRAME DELIMITER DETECTION

(75) Inventors: Chaohuang Zeng, Sunnyvale, CA (US); William McFarland, Los Altos, CA (US)

(73) Assignee: Atheros Communications, Inc., Sunnyvale, CA (US)

(*) Notice: Subject to any disclaimer, the term of this patent is extended or adjusted under 35 U.S.C. 154(b) by 810 days.

This patent is subject to a terminal disclaimer.

(21) Appl. No.: 11/605,502

(22) Filed: Nov. 28, 2006

(65) Prior Publication Data

US 2007/0086423 A1 Apr. 19, 2007

Related U.S. Application Data

(63) Continuation of application No. 10/139,653, filed on May 3, 2002, now Pat. No. 7,161,955.

(51) Int. Cl.
*H04J 3/24* (2006.01)

(52) U.S. Cl. .................... 370/349; 370/509

(58) Field of Classification Search ........... None
See application file for complete search history.

(56) References Cited

U.S. PATENT DOCUMENTS 5,706,428 A * 1/1998 Boer et al. ............ 370/342
7,161,955 B1 * 1/2007 Zeng et al. ............ 370/466
7,181,298 B1 2/2007 Yoshio et al.

FOREIGN PATENT DOCUMENTS

TW 469718 12/2001

* cited by examiner

*Primary Examiner*—Duc C Ho
(74) *Attorney, Agent, or Firm*—Van Pelt, Yi & James LLP

(57) ABSTRACT

A modified approach to detecting the start frame delimiter (SFD) is disclosed. A receiving system scans a decoded but not yet de-scrambled received signal for a scrambled version of the SFD associated with the preamble format being used. Using this approach, it is not necessary to use any bits intended for use in synchronization to initialize a de-scrambler so as to be able to de-scramble the SFD portion of the preamble for detection. The bits that otherwise would have been dedicated to initializing the de-scrambler may then be used for synchronization, as intended. Detecting fewer than all bits comprising a start frame delimiter is described. Bits not used for SFD detection may be used for other purposes, such as synchronization.

20 Claims, 8 Drawing Sheets

MODIFIED START FRAME DELIMITER DETECTION

CROSS REFERENCE TO RELATED APPLICATIONS

This application is a continuation of U.S. patent application Ser. No. 10/139,653, entitled MODIFIED START FRAME DELIMITER DETECTION, filed May 3, 2002 now U.S. Pat. No. 7,161,955, which is incorporated herein by reference for all purposes.

FIELD OF THE INVENTION

The present invention relates generally to wireless communications. More specifically, a modified approach to detecting a start frame delimiter is disclosed.

BACKGROUND OF THE INVENTION

Packet switched network protocols, in which data is sent from one node to another in the form of one or more discrete packets, have long been used in conventional wired networks to manage the exchange of data between network nodes. In wireless communications, it is sometimes advantageous to employ a protocol that allows for the transmission and receipt of data packets. One such environment is the wireless local area network (LAN) environment.

To facilitate the development and use of wireless LAN ("WLAN" or "WiLAN") technology, the Institute of Electrical and Electronics Engineers (IEEE) has promulgated a series of standards, the IEEE Standard 802.11 series, to provide standardized specifications for the medium access control (MAC) and physical layer (PHY) for such a wireless LAN. IEEE Standard 802.11b, for example, provides the specifications for extending the PHY layer in the 2.45 GHz band.

Like packet switched communication protocols in a wired network environment, the IEEE Standard 802.11b prescribes a packet format in which each packet comprises a preamble portion, a header portion, and a data portion, transmitted in that order. In general, the preamble portion is used by the receiving system to recognize that a packet is being received and to perform synchronization operations to enable the receiving system to reliably receive and interpret the incoming packet. The header portion typically is used to provide to the receiving system information concerning the data portion that will follow, such as by indicating how much data is being sent in the packet and what signaling or protocol is being used to transmit the data portion. The data portion, sometimes referred to as the "payload" of the packet, comprises all or a part of a message the sending system is communicating to the receiving system. The message may comprise, for example, a request for data available from the receiving system or data sent by the sending system in response to a request received from the receiving system.

In certain environments, such as in a wireless LAN environment operating under IEEE Standard 802.11b, more than one packet format may be prescribed. For example, IEEE Standard 802.11b specifies a long preamble format and a short preamble format. The long preamble format may be needed, for example, for use with legacy or other systems that employ the 1 Megabit per second (Mbps) mode of operation under IEEE Standard 802.11b. The short preamble format, on the other hand, may be suitable for use with higher data rate modes of operation, such as for 2 Mbps, 5.5 Mbps, and 11 Mbps modes of operation.

Under IEEE Standard 802.11b, for both the long preamble format and the short preamble format the preamble comprises a first set of bits to be used for synchronization operation and a second set of bits, termed the "start frame delimiter" (SFD), which second set of bits the receiving system uses to recognize that the end of the preamble has been reached and the header portion of the packet is about to begin. Under IEEE Standard 802.11b, the long preamble comprises 128 bits for synchronization and a 16 bit SFD, whereas the short preamble comprises 56 bits for synchronization and a different 16 bit SFD. Under IEEE Standard 802.11b, the SFD is a prescribed 16-bit sequence, with the short preamble SFD being the reverse of the long preamble SFD. A receiving system typically looks at the decoded, de-scrambled received signal to determine when a match for the SFD corresponding to the preamble format used for the packet has been received.

In general, the more received bits the receiving system has available to it for synchronization, the better, because by performing synchronization operations using more received bits the receiving system can achieve better synchronization with the transmitting system and better channel sensitivity, with the result that the data packet is received and interpreted more reliably. For example, in a system in which channel estimation is used to create a model of the channel and correct at the receiving end for any changes made to the transmitted signal by the channel before the signal is received by the receiving system, be able to devote more bits to channel estimation typically would result in a more accurate and/or complete model of the channel.

In certain implementations, such as where synchronization is performed using the decoded but not yet de-scrambled received signal, it would be necessary to consume one or more of the bits intended for synchronization in the initialization of a de-scrambler at the receiving system in order to detect the SFD. It would be advantageous to not lose the availability of these bits for synchronization operations. In addition, especially where a short preamble is used, it would be advantageous to make more bits of the preamble available for synchronization while still reliably detecting the SFD.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A modified approach to detecting the start frame delimiter (SFD) is disclosed. In one embodiment, the receiving system scans the decoded but not yet de-scrambled received signal for a scrambled version of the SFD associated with the preamble format being used. Using this approach, it is not necessary to use any bits intended for use in synchronization to initialize the de-scrambler so as to be able to de-scramble the SFD portion of the preamble for detection. The bits that otherwise would have been dedicated to initializing the de-scrambler may then be used for synchronization, as intended.

In one embodiment, the receiving system is configured to scan the received signal for a match with fewer than all of the prescribed bits of the SFD. The remaining bits not used for SFD detection may in one embodiment be made available for use in synchronization, thereby providing for better synchronization and channel sensitivity. This approach may be advantageous where a single preamble format is used as well as where multiple preamble formats are used. It may be particularly advantageous in contexts where a relatively short preamble is used.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
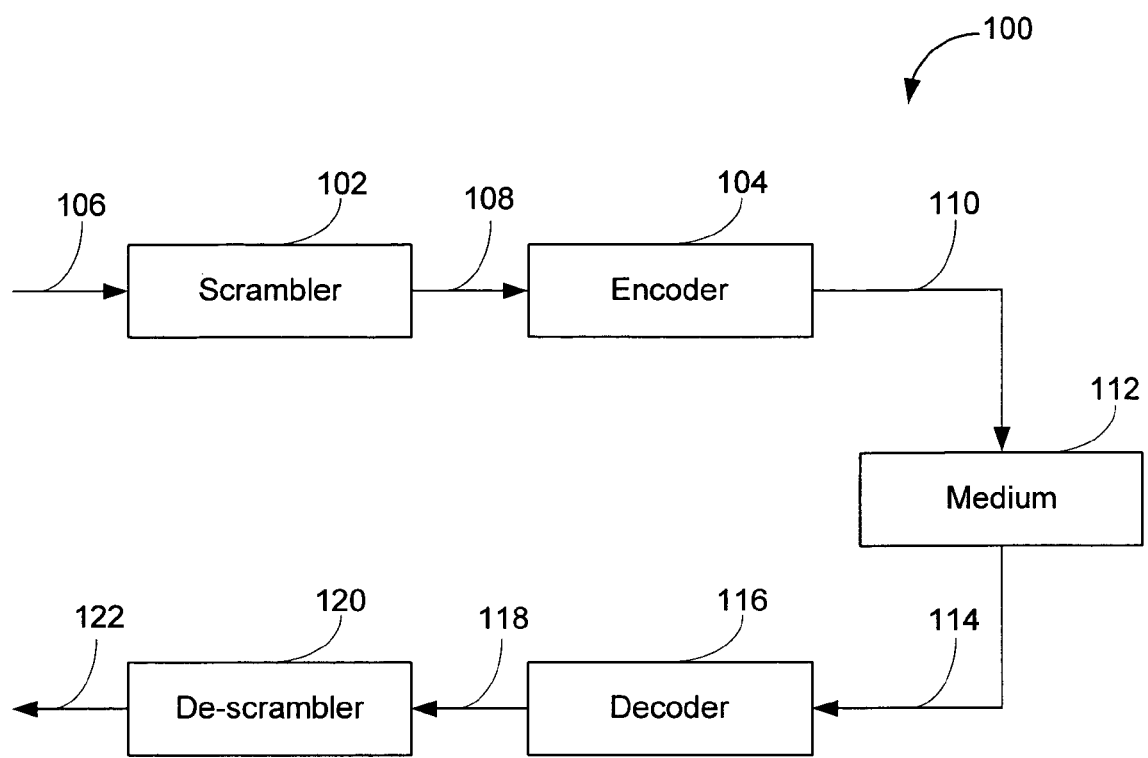
FIG. 1 is a schematic diagram of a typical transmission system 100.

FIG. 1 is a schematic diagram of a typical transmission system 100. On the transmit side, the transmission system 100 comprises a scrambler 102 and an encoder 104. The scrambler 102 receives as input source data 106, scrambles the source data 106, and provides as output scrambled data 108. The scrambled data 108 is provided as input to the encoder 104, which provides as output an encoded signal 110 for transmission. The encoded signal 110 is transmitted through a medium 112 and is received by the receiving end of the transmission system as a received signal 114. On the receiving end, the received signal 114 is decoded by a decoder 116, which provides as output a decoded received signal 118. The decoded received signal 118 is provided as input to a de-scrambler 120, which reverses the process performed by scrambler 102 to provide as output a decoded and de-scrambled received signal 122.

Figure 2:
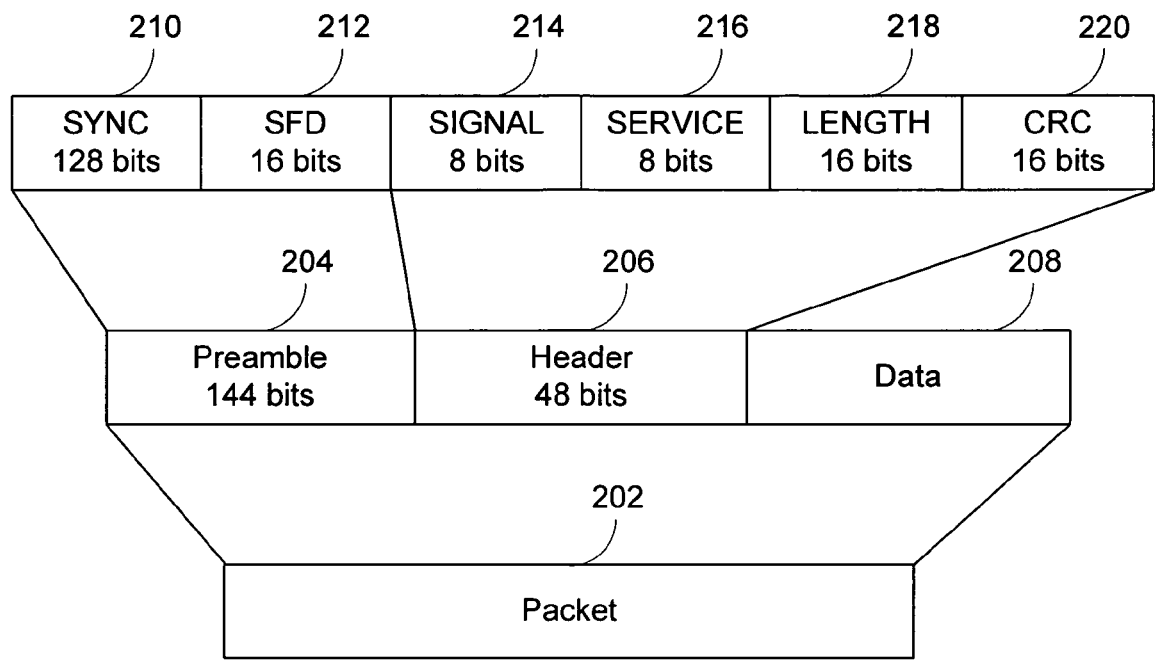
FIG. 2 is a schematic diagram showing the structure of a data packet transmitted under IEEE Standard 802.11b for a packet in which the long preamble format is used.

FIG. 2 is a schematic diagram showing the structure of a data packet transmitted under IEEE Standard 802.11b for a packet in which the long preamble format is used. The packet 202 comprises a preamble portion 204, a header portion 206, and a data portion 208. The preamble portion 204 comprises 144 bits, which is the prescribed length for a long preamble under IEEE Standard 802.11b. The header portion 206 comprises 48 bits, and the data portion 208 comprises a variable number of bits depending on the amount of data included in the packet. The preamble portion 204 10 comprises a synchronization portion 210, comprising 128 bits, and a start frame delimiter (SFD) portion 212 comprising 16 bits. The header portion 206 comprises a signaling portion 214 used to provide an 8-bit long code identifying which of the modes of operation under IEEE Standard 802.11b is being used to send the data portion of the packet. The standard prescribes a code for each of the four modes of operation, 1 Mbps, 2 Mbps, 5.5 Mbps, and 11 Mbps. The header portion 206 further comprises a service portion 216 comprising 8 bits. Under IEEE Standard 802.11b, only three of the bits are currently assigned a function, with the remaining bits being reserved for future use. Of the three bits designated for use in the standard, one is used to extend the length field, described below, to resolve a potential ambiguity in the information that may be provided in the length portion; and of the remaining two, one is used to indicate the modulation method used and the second is used to indicate whether the transmit frequency and symbol clocks are derived from the same oscillator. The header portion 206 further comprises a length portion 218. The length portion 218 is used to provide an indication of how much data is included in the data portion 208 of the packet. Under IEEE Standard 802.11b, the data provided in the length portion 218 of the header portion 206 indicates the length expressed as a transmission time for the data portion 208. The standard provides formulas for calculating the time based on how much data is to be sent. The header portion 206 further comprises a cyclic redundancy code (CRC) portion 220. The CRC portion 220 comprises 16 bits and is used to detect errors in the header portion 206 by storing the calculation of a result based on the data contained in the signaling portion 214, the service portion 216, and the length portion 218 of the header 206. At the receiving end, the receiving system repeats the calculation used to calculate the CRC code stored in the CRC portion 220 and verifies that the result of the calculation on the receiving end matches the result stored in the CRC portion 220 of the header portion 206.

Figure 3:
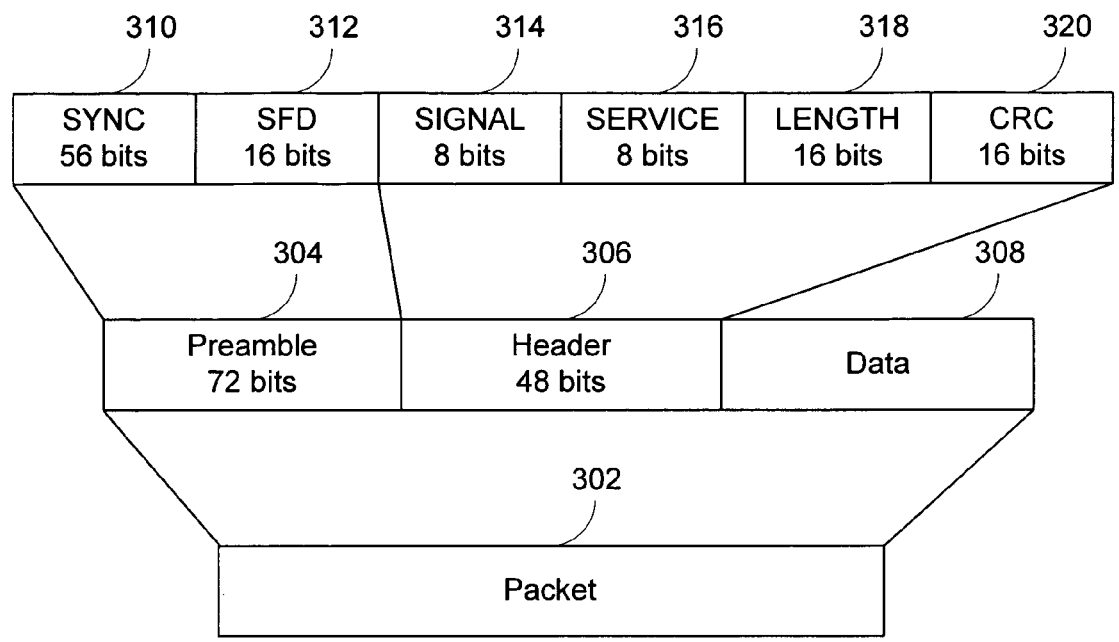
FIG. 3 shows a packet 302 in which the short preamble format prescribed in IEEE Standard 802.11b is used.

FIG. 3 shows a packet 302 in which the short preamble format prescribed in IEEE Standard 802.11b is used. The packet 302 comprises a preamble portion 304 comprising 72 bits, a header portion 306 comprising 48 bits, and a data portion 308, the length of which is determined by the amount of data being sent in the packet. Comparing FIG. 2 and FIG. 3, the preamble 204 of FIG. 2 comprises 144 bits whereas the preamble 304 of FIG. 3 comprises only 72 bits. The preamble 304 of FIG. 3 comprises a synchronization portion 310 and an SFD portion 312. The synchronization portion 310 comprises 56 bits, compared to the 128 bits included in the synchronization portion 210 of the long preamble shown in FIG. 2. The SFD portion 312 comprises 16 bits, the same length as the SFD portion 212 of the preamble 204 shown in FIG. 2. The difference, under IEEE Standard 802.11b, is that the SFD prescribed for a short format preamble such as shown in FIG. 3 is the reverse of the 16-bit SFD code prescribed for a packet in which the long preamble format is used. A further difference under IEEE Standard 802.11b is that for the long preamble format, the 128 bits of the synchronization portion 210 comprise 128 scrambled 1's, whereas the 56 bits stored in the synchronization portion 310 of the short format preamble shown in FIG. 3 comprise a series of 56 scrambled 0's. Therefore, in addition to the length of the synchronization portion of the preamble, the long format preamble and the short format preamble differ from each other in terms of (1) the data used for the synchronization portion and (2) the code used for the SFD. The header portion 306 of the packet 302 shown in FIG. 3 comprises a signaling portion 314, a service portion 316, a length portion 318, and a CRC portion 320 all of which are the same length as and perform the same function as the corresponding portions of the header 206 shown in FIG. 202.

Figure 4:
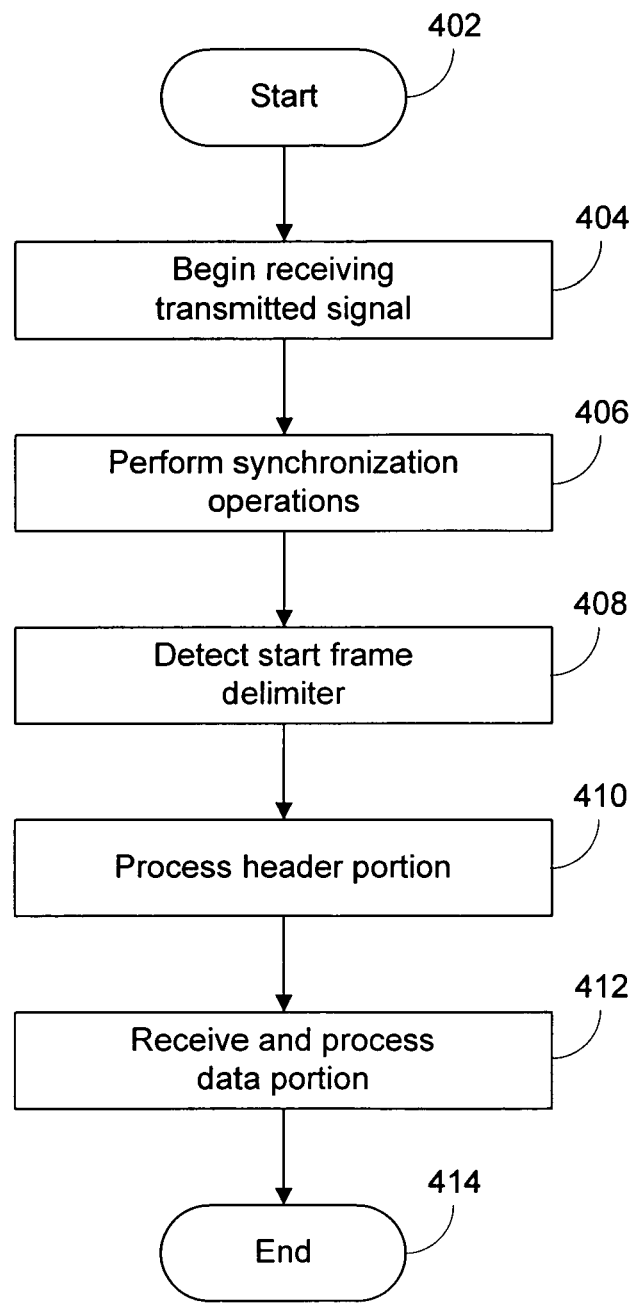
FIG. 4 is a flowchart illustrating a process used in one embodiment to receive and process a data packet.

FIG. 4 is a flowchart illustrating a process used in one embodiment to receive and process a data packet. In one embodiment, the data packet comprises a data packet sent under IEEE Standard 802.11b, using either the long preamble format or the short preamble format. The process starts at step 402, in which the receiving system is in standby mode, and proceeds to step 404 in which the receiving system begins receiving a transmitted signal. In step 406, the receiving system performs synchronization operations. In one embodiment, the synchronization operations performed in step 406 comprise operations used to enable the receiving system to process the received signal in such a way as to be able to more reliably interpret the signal and determine what signal was transmitted by the transmitting station, as described more fully below in connection with FIG. 5. In step 408, the start frame delimiter (SFD) is detected by the receiving system. In one embodiment, the start frame delimiter is detected by scanning the decoded and de-scrambled received signal for a match to the SFD prescribed for the type of packet received. In one embodiment, as described more fully below, the synchronization operations performed in step 406 comprise dynamic detection of the type of preamble used for the received packet and association of the type of preamble received with the start frame delimiter prescribed for a data packet of the type received. In one embodiment, IEEE Standard 802.11b applies and dynamic preamble detection is used to determine whether the long preamble format or the short preamble format was used for the data packet. Based on the determination of which preamble format is being used, in one embodiment the receiving system in step 408 scans the decoded and de-scrambled received signal to detect the SFD prescribed in the 802.11b standard for a data packet having the preamble format detected in step 406. In one embodiment, in step 408 the receiving system detects the start frame delimiter by scrambling the SFD prescribed by the applicable standard or specification and scanning the decoded but not yet de-scrambled received signal for a match to the scrambled version of the SFD. Once the SFD is detected in step 408, the header portion of the data packet, which begins immediately after the end of the SFD, as described above, is processed in step 410. In one embodiment, in step 410 the signaling mode, length, and service data are read and processed, as described above, and the CRC portion of the header is read and compared to a CRC result determined by the receiving system based on the received data for the signaling, service, and length portions of the header, as described above. In step 412, the data portion of the packet is received and processed. In one embodiment, the receipt and processing of the data portion of the packet in step 412 is determined by application layer protocols and/or application programs associated with the data portion of the packet. The process shown in FIG. 4 then ends in step 414.

Figure 5:
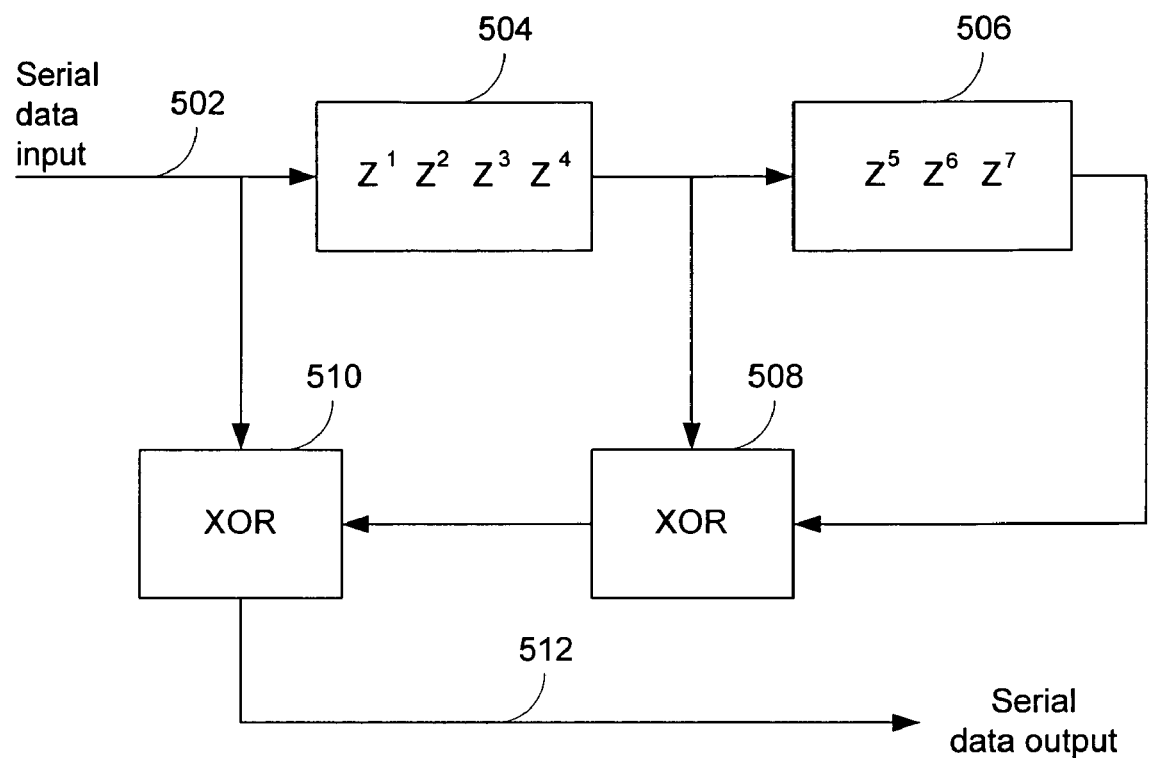
FIG. 5 is a schematic diagram illustrating an architecture used in one embodiment to implement a de-scrambler, such as the de-scrambler 120 of FIG. 1.

FIG. 5 is a schematic diagram illustrating an architecture used in one embodiment to implement a de-scrambler, such as the de-scrambler 120 of FIG. 1. The particular architecture shown in FIG. 5 is one suggested by the 802.11b standard. As shown in FIG. 5, the decoded received signal is provided as a serial data input 502 to a first set of registers 504 comprising four registers identified in FIG. 5 as registers $Z^1$, $Z^2$, $Z^3$, and $Z^4$. The output of the first set of registers 504 is provided as input to a second set of registers 506 comprising three registers identified in FIG. 5 as registers $Z^5$, $Z^6$, and $Z^7$. The output of the first set of registers 504 is also provided to a first exclusive or (XOR) gate 508. The output of the second set of registers 506 is also provided as an input to XOR gate 508. The output of XOR gate 508 is provided as an input to XOR gate 510. The decoded received signal 502 is also provided as a serial data input to XOR gate 510. The output 512 of the XOR gate 510 comprises serial data output comprising a de-scrambled and decoded received signal. The de-scrambling polynomial prescribed in the 802.11b standard is $G(z) = z^7 + z^{-4} + 1$. As can be seen from the architecture shown in FIG. 5, in order for the de-scrambler shown in FIG. 5 to operate initial values must be provided for each of the seven registers $Z^1$ to $Z^7$. As a result, seven bits of decoded received signal 502 must be provided as input to the de-scrambler shown in FIG. 5 before the first bit of valid de-scrambled output can be provided as output from the de-scrambler as serial data output 512. As a result, in an implementation in which the start frame delimiter (SFD) is detected by scanning the decoded and de-scrambled received signal to find a match for the start frame delimiter indicated by the applicable standard or specification, such as in one embodiment the 802.11b specification, seven bits preceding the start frame delimiter must be used to initialize the de-scrambler in order to be able to scan decoded and de-scrambled received bits for a match for the SFD. However, as noted above, in the short preamble format under the 802.11b standard the SFD portion of the preamble is preceded by a synchronization portion comprising 56 bits. In one embodiment, the synchronization operations to be performed using the synchronization bits comprise a plurality of operations including in one embodiment automatic gain control, DC offset correction, frequency offset estimation, channel estimation, and channel analysis. In one embodiment, in order to perform all such synchronization operations, all of the synchronization bits must be available to be used in performing synchronization operations and the system cannot spare the use of seven of the synchronization bits to initialize the de-scrambler in order to permit for the matching of the decoded and de-scrambled SFD portion of the preamble with the expected SFD.

Note that in certain implementations the receiving system may be configured to de-scramble all or a portion of the synchronization bits comprising the synchronization portion of the preamble. However, if the de-scrambler is initialized to perform such de-scrambling of synchronization bits prior to the completion of such synchronization functions as channel estimation, there may be numerous errors in the output of the de-scrambler such that the output, while reliable enough to perform certain synchronization operations, may not be sufficiently reliable to enable the receiving system to determine accurately and reliably when the start frame delimiter portion of the preamble has been reached. As a result, in one embodiment the de-scrambler is disabled once the need for de-scrambled synchronization bits for use in synchronization operations has ceased and re-initialized later in the processing of the received data packet, such after the channel estimation process has been completed. The problem is that in order to be able to scan reliable de-scrambled data for a match for the expected SFD, such re-initialization would have to be accomplished using synchronization bits, which bits would then not be available for use in synchronization operations.

To avoid this problem, in one embodiment instead of scanning the decoded and de-scrambled received signal for a match to the expected SFD, the receiving system is configured to scan the decoded but not yet de-scrambled received signal for a match with a scrambled version of the expected SFD. In one embodiment, in which a de-scrambler of the type shown in FIG. 5 is used, detecting the scrambled SFD rather than the de-scrambled SFD of the received data packet enables the system to delay initialization of the de-scrambler and by doing so to avoid using seven bits of the synchronization bits for that purpose.

Figure 6:
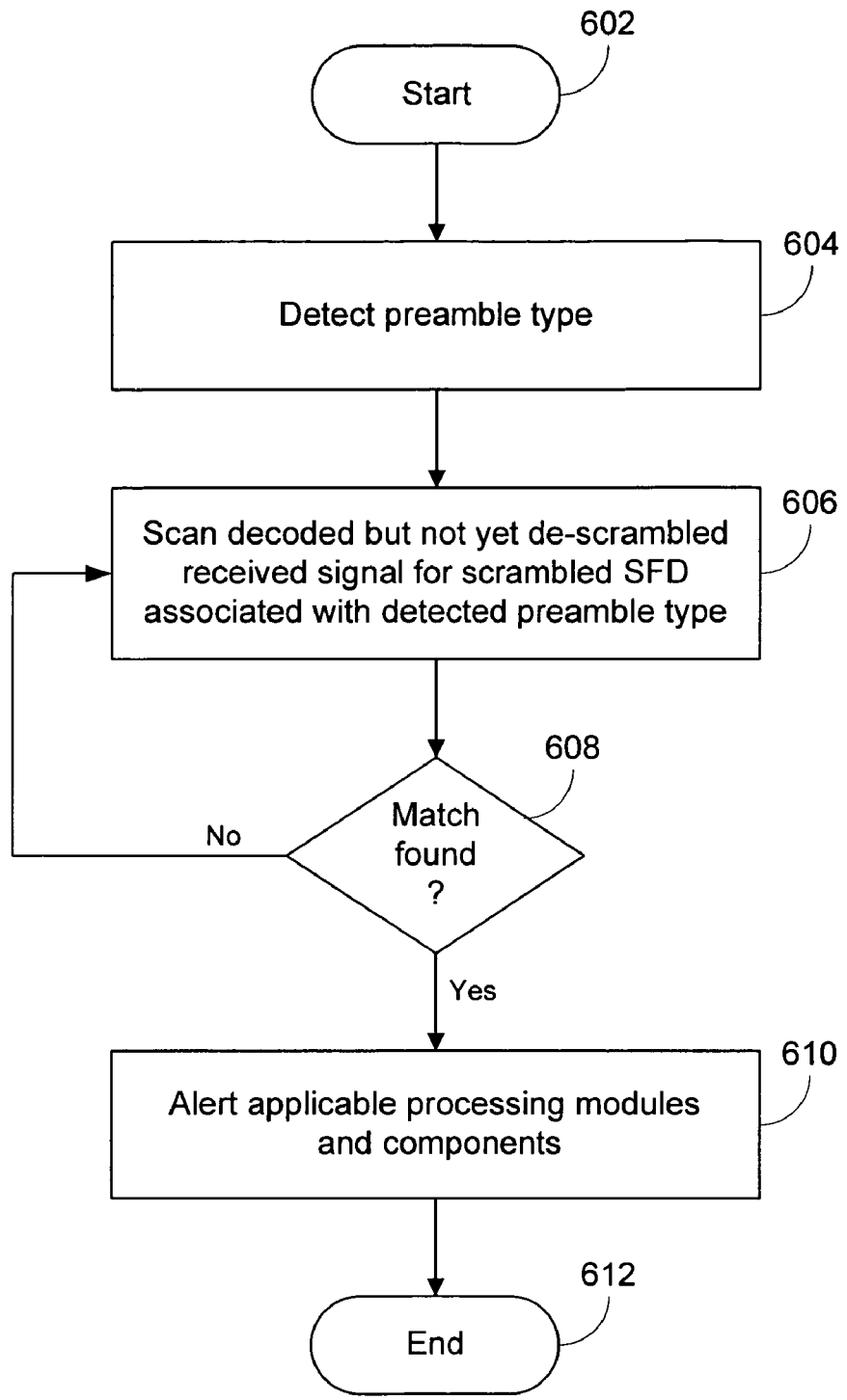
FIG. 6 is a flowchart illustrating a process used in one embodiment to detect a scrambled SFD in an implementation in which more than one preamble format may be used, such as the 802.11b WiLAN standard.

FIG. 6 is a flowchart illustrating a process used in one embodiment to detect a scrambled SFD in an implementation in which more than one preamble format may be used, such as the 802.11b WiLAN standard. The process starts in step 602 and proceeds to step 604 in which the preamble type is detected. In one embodiment, the preamble type is detected by de-scrambling at least a subset of the synchronization bits and analyzing the de-scrambled bits to determine which preamble format was used based on the data values used for the synchronization bits. A system and method for dynamic preamble detection are described more fully in the co-pending application entitled: "Dynamic Preamble Detection", filed concurrently herewith and incorporated in by reference above. In step 606 of the process shown in FIG. 6, the decoded but not yet de-scrambled received signal is scanned by the receiving system to find a match with a scrambled version of the start frame delimiter associated with the preamble type detected in step 604. For example, under the 802.11b standard, the SFD for a long preamble format packet is a 16-bit sequence prescribed in the standard and the SFD for a short preamble format packet is prescribed in the standard as being the reverse of the 16-bit SFD indicated for a long format preamble. In step 608, it is determined whether a match has been found in the decoded but not yet de-scrambled received signal for the scrambled SFD associated with the detected preamble type. If it is determined in step 608 that a match has not yet been found, the process returns to step 606 in which the system continues scanning the decoded but not yet de-scrambled received signal for a match. If it is determined in step 608 that a match has been found, the process proceeds to step 610 in which the system alerts the applicable processing modules and/or components that the SFD has been detected. In one embodiment, step 610 comprises informing the circuitry, components, and/or software modules involved in processing the header portion of the data packet that the SFD has been detected and that the subsequent bits comprise the header portion of the data packet. The process shown in FIG. 6 then ends in step 612.

Figure 7:
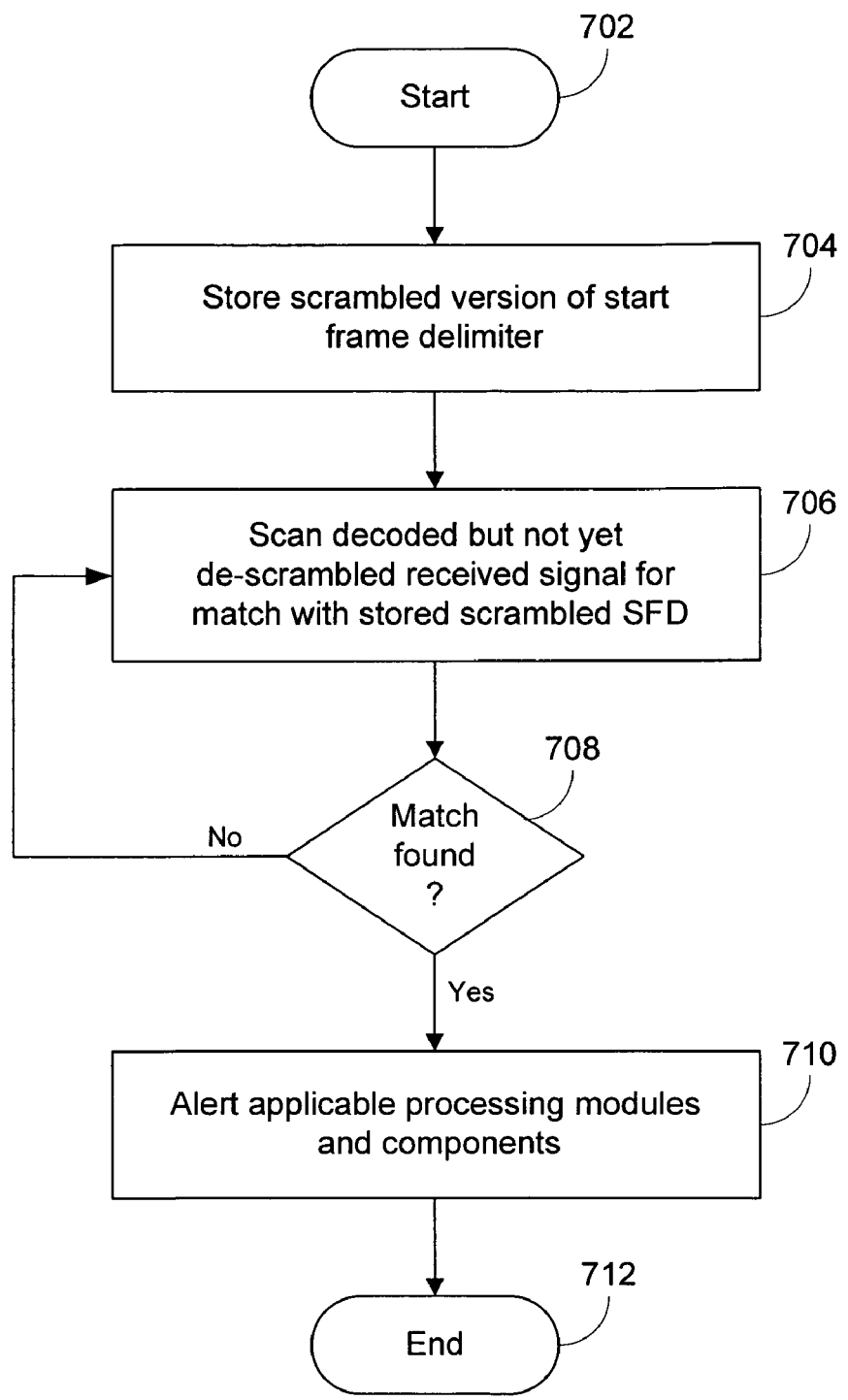
FIG. 7 is a flowchart illustrating a process used in one embodiment to detect a match for a scrambled SFD in a decoded but not yet de-scrambled received signal in an implementation in which only a single SFD is used.

The above-described process is not limited in application to implementations in which more than one preamble type may be used such that more than one SFD may be used. FIG. 7 is a flowchart illustrating a process used in one embodiment to detect a match for a scrambled SFD in a decoded but not yet de-scrambled received signal in an implementation in which only a single SFD is used. The process starts in step 702 and proceeds to step 704 in which a scrambled version of the SFD is stored. In step 706, the decoded but not yet de-scrambled received signal is scanned for a match with the scrambled SFD stored in step 704. In step 708, it is determined whether a match has been found in the decoded but not yet de-scrambled received signal for the scrambled SFD stored in step 704. If it is determined in step 708 that match has not yet been found, the process returns to step 706 in which the system continues to scan the decoded but not yet de-scrambled signal for a match. If it is determined in step 708 that a match has been found, the process proceeds to step 710 in which the applicable processing modules and components are alerted to the fact that the SFD has been detected. The process then ends in step 712.

The processes described above in connection with FIGS. 6 and 7 are used to detect in the decoded but not yet de-scrambled received signal a match for the expected SFD for purposes of avoiding the use of synchronization bits to initialize the de-scrambler to permit SFD detection to be performed on the de-scrambled received signal in applications in which extra synchronization bits may not be available, such as an implementation under the 802.11b standard in which channel estimation is used for data packets and the short format preamble may be used. In one embodiment, additional bits are made available for use in performing synchronization operations by detecting a modified start frame delimiter comprising a subset of the expected SFD sequence and using the remaining bits as additional bits available for synchronization operations.

Figure 8:
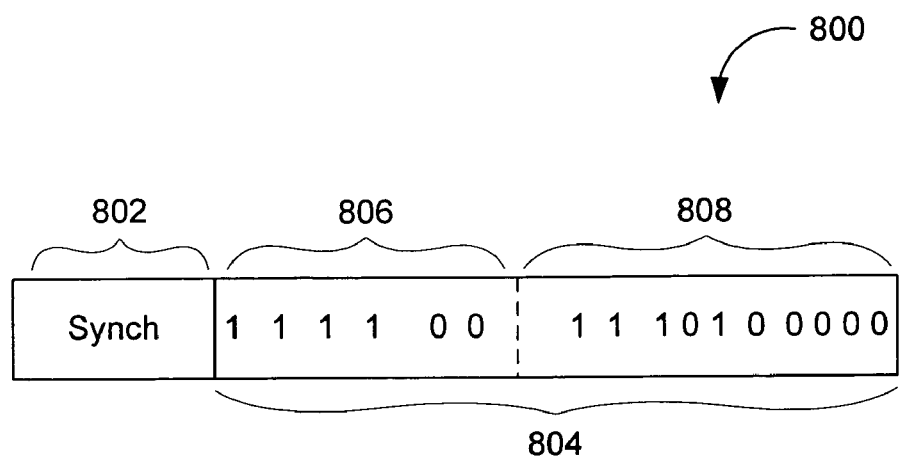
FIG. 8 shows a preamble portion 800 of a received data packet. The preamble portion 800 comprises a synchronization portion 802 in which synchronization bits are provided, as described above.

FIG. 8 shows a preamble portion 800 of a received data packet. The preamble portion 800 comprises a synchronization portion 802 in which synchronization bits are provided, as described above. The preamble 800 further comprises an SFD portion 804 in which a prescribed SFD sequence is provided. As shown in FIG. 8, the SFD portion 804 of the preamble portion 800 comprises a sequence of 16 bits. The 16-bit sequence shown in the example illustrated in FIG. 8 corresponds to the 16-bit SFD prescribed in the 802.11b standard for the long format preamble. As shown in FIG. 8, the SFD portion 804 of the preamble 800 has been divided into a first portion 806 and a second portion 808. The first portion 806 comprises the first six bits of the SFD portion 804 and the second portion 808 comprises the final ten bits of the SFD portion 804. In one embodiment, the SFD bits comprising the first portion 806 of the SFD are made available for use in synchronization operations as an extension of the synchronization bits provided in the synchronization portion 802.

When a first portion of the bits of the SFD portion of the preamble are made available for use in synchronization operations as described above, the system is configured to detect a modified SFD comprising the final portion of the expected SFD sequence that remains once a number of bits have been removed from the beginning of the expected SFD sequence that is equal to the number of bits from the SFD portion of the preamble that have been made available for synchronization operations. In the example shown in FIG. 8, the first portion 806 made available for use in synchronization operations comprises six bits. As a result, in performing SFD detection as described above in connection with FIGS. 6 and 7, the system would be configured to search for the final ten bits of the expected SFD sequence and not for the full SFD sequence. That is, referring further to FIG. 8, the system would be configured to search either for an SFD comprising the sequence 1 1 1 0 1 0 0 0 0 0 in the decoded and de-scrambled received signal or for the scrambled version of said 10-bit SFD sequence in the decoded and not de-scrambled received signal. In the latter case, the ten-bit modified SFD sequence would be scrambled and the system would be configured to scan the decoded but not yet de-scrambled received signal for the scrambled 10-bit modified SFD sequence, as described above in connection with FIGS. 6 and 7. The approach illustrated in FIG. 8 may be used to provide additional bits for use in synchronization whether the SFD detection is performed before or after de-scrambling. In one embodiment, the first seven bits of the SFD portion of the preamble portion of the data packet are made available for synchronization operations and the system is configured to scan the decoded and not yet de-scrambled received signal for a match for a scrambled version of a modified SFD comprising the last nine bits of the scrambled SFD.

By using the techniques described above, either singly or in combination, additional bits may be made available for use in synchronization, resulting in a more reliable receipt and interpretation of a received signal at a receiving station.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for detecting a start frame delimiter, the start frame delimiter comprising a known sequence of data values, comprising:
   receiving a data packet comprising a scrambled sequence of data bits;
   using a processor to scan the scrambled sequence of data bits for a match with a scrambled version of the known sequence of data values; and
   initializing a de-scrambler once a match has been found in the received scrambled sequence of data bits for the scrambled version of the known sequence of data values, including by re-initializing the de-scrambler subsequent to an initial period of de-scrambler operation.

2. The method of claim 1, further comprising scrambling the known sequence of data values.

3. The method of claim 1, further comprising storing the scrambled version of the known sequence of data values.

4. The method of claim 1, further comprising providing an indication, in the event that a match for the scrambled version of the known sequence of data values is found, that the start frame delimiter has been detected.

5. The method of claim 4, wherein the data packet comprises a preamble portion and a header portion, the preamble portion preceding the header portion and comprising the start frame delimiter, wherein the indication is provided to a component, module, or process configured to process data comprising the header portion.

6. The method of claim 1, wherein the start frame delimiter is prescribed by IEEE Standard 802.11b.

7. The method of claim 1, wherein the data packet includes a preamble portion and a plurality of preamble formats are able to be used for the preamble portion.

8. A system for detecting a start frame delimiter, the start frame delimiter comprising a sequence of known data values comprising:
   a receiver configured to receive a data packet comprising a scrambled sequence of data bits; and
   a processing component configured to:
      scan the scrambled sequence of data bits for a match with a scrambled version of the known sequence of data values; and
      initialize a de-scrambler once a match has been found in the received scrambled sequence of data bits for the scrambled version of the known sequence of data values, including by re-initializing the de-scrambler subsequent to an initial period of de-scrambler operation.

9. A system as recited in claim 8, wherein the processing component is further configured to scramble the known sequence of data values.

10. A system as recited in claim 8, wherein the processing component is further configured to store the scrambled version of the known sequence of data values.

11. A system as recited in claim 8, wherein the processing component is further configured to provide an indication, in the event that a match for the scrambled version of the known sequence of data values is found, that the start frame delimiter has been detected.

12. A system as recited in claim 11, wherein the data packet comprises a preamble portion and a header portion, the preamble portion preceding the header portion and comprising the start frame delimiter, wherein the indication is provided to a component, module, or process configured to process data comprising the header portion.

13. A system as recited in claim 8, wherein the start frame delimiter is prescribed by IEEE Standard 802.11b.

14. The system of claim 8, wherein the data packet includes a preamble portion and a plurality of preamble formats are able to be used for the preamble portion.

15. A computer readable storage medium encoded with computer executable instructions for:
   receiving a data packet comprising a scrambled sequence of data bits;
   scanning the scrambled sequence of data bits for a match with a scrambled version of the known sequence of data values; and
   initializing a de-scrambler once a match has been found in the received scrambled sequence of data bits for the scrambled version of the known sequence of data values, including by re-initializing the de-scrambler subsequent to an initial period of de-scrambler operation.

16. A computer readable storage medium as recited in claim 15, further comprising computer instructions for scrambling the known sequence of data values.

17. A computer readable storage medium as recited in claim 15, further comprising computer instructions for storing the scrambled version of the known sequence of data values.

18. A computer readable storage medium as recited in claim 15, further comprising computer instructions for providing an indication, in the event that a match for the scrambled version of the known sequence of data values is found, that the start frame delimiter has been detected.

19. The computer readable storage medium as recited in claim 18, wherein the data packet comprises a preamble portion and a header portion, the preamble portion preceding the header portion and comprising the start frame delimiter, wherein the indication is provided to a component, module, or process configured to process data comprising the header portion.

20. The computer readable storage medium as recited in claim 15, wherein the start frame delimiter is prescribed by IEEE Standard 802.11b.

* * * * *